(12) United States Patent
Carnevali

(10) Patent No.: US 8,926,349 B2
(45) Date of Patent: Jan. 6, 2015

(54) UNIVERSAL ADAPTOR MOUNT FOR A DOCKING STATION

(76) Inventor: Jeffrey D. Carnevali, Seattle, WA (US)

( * ) Notice: Subject to any disclaimer, the term of this patent is extended or adjusted under 35 U.S.C. 154(b) by 336 days.

(21) Appl. No.: 13/523,836

(22) Filed: Jun. 14, 2012

(65) Prior Publication Data

US 2013/0223003 A1 Aug. 29, 2013

Related U.S. Application Data

(63) Continuation-in-part of application No. 13/403,751, filed on Feb. 23, 2012.

(51) Int. Cl.
*H01R 29/00* (2006.01)
(52) U.S. Cl.
USPC ......................................................... 439/170
(58) Field of Classification Search
USPC ............. 361/679.41–679.45, 679.55–679.56; 439/929, 170
See application file for complete search history.

(56) References Cited

U.S. PATENT DOCUMENTS

| | | | | |
|---|---|---|---|---|
| 4,367,001 A * | 1/1983 | Munakata | 439/175 |
| 4,780,090 A * | 10/1988 | Sugiyama et al. | 439/247 |
| 4,836,804 A * | 6/1989 | London et al. | 439/598 |
| 4,944,686 A * | 7/1990 | Gertz | 439/175 |
| 5,144,290 A * | 9/1992 | Honda et al. | 345/156 |
| 5,186,646 A * | 2/1993 | Pederson | 439/374 |
| 5,492,489 A * | 2/1996 | Chavakula | 439/655 |
| 5,535,093 A * | 7/1996 | Noguchi et al. | 361/679.43 |
| 5,535,274 A * | 7/1996 | Braitberg et al. | 379/446 |
| 5,552,959 A * | 9/1996 | Penniman et al. | 361/679.41 |
| 5,569,052 A * | 10/1996 | Belt et al. | 439/638 |
| 5,694,292 A * | 12/1997 | Paulsel et al. | 361/679.43 |
| 5,699,226 A * | 12/1997 | Cavello | 361/679.43 |
| 5,752,845 A * | 5/1998 | Fu | 439/247 |
| 5,933,321 A * | 8/1999 | Ruch et al. | 361/679.42 |
| 5,964,601 A * | 10/1999 | Tsurumaru et al. | 439/141 |
| 6,009,168 A * | 12/1999 | Snyder et al. | 379/446 |
| 6,122,019 A * | 9/2000 | Do et al. | 348/843 |
| 6,176,716 B1 * | 1/2001 | Mercurio et al. | 439/166 |
| 6,188,572 B1 * | 2/2001 | Liao et al. | 361/679.42 |
| 6,208,734 B1 * | 3/2001 | Ortscheid et al. | 379/446 |
| 6,301,106 B1 * | 10/2001 | Helot et al. | 361/679.55 |
| 6,321,340 B1 * | 11/2001 | Shin et al. | 713/310 |
| 6,341,218 B1 * | 1/2002 | Poplawsky et al. | 455/569.1 |
| 6,352,447 B1 * | 3/2002 | Ruth | 439/540.1 |
| 6,364,697 B1 * | 4/2002 | Tseng et al. | 439/533 |
| 6,406,313 B1 * | 6/2002 | Victor | 439/175 |
| 6,407,914 B1 * | 6/2002 | Helot | 361/679.41 |
| 6,438,229 B1 * | 8/2002 | Overy et al. | 379/446 |
| 6,527,572 B2 * | 3/2003 | Jou | 439/248 |
| 6,558,201 B1 * | 5/2003 | Begley et al. | 439/638 |
| 6,587,152 B1 * | 7/2003 | Sharp et al. | 348/373 |

(Continued)

*Primary Examiner* — Ross Gushi
(74) *Attorney, Agent, or Firm* — Charles J. Rupnick Attorney at Law

(57) ABSTRACT

A docking station having a docking tray that is adapted for seating a portable electronic device therein with a docking port of the portable electronic device seated against an interface portion thereof, and the interface portion of the docking tray being formed with an interface outlet aperture positioned for alignment with the docking port of the portable electronic device. A connector retainer is coupleable for releasably urging individual ones of a plurality of different interfaces toward the interface portion of the docking tray and positioning a connection portion thereof adjacent to the interface outlet aperture and directed inwardly of the docking tray. An urging mechanism is adapted for urging the seated portable electronic device toward the interface portion of the docking tray and the interface outlet aperture thereof.

23 Claims, 4 Drawing Sheets

(56) References Cited

U.S. PATENT DOCUMENTS

| | | | |
|---|---|---|---|
| 6,588,937 B2 * | 7/2003 | Imai et al. | 385/53 |
| 6,592,387 B2 * | 7/2003 | Komenda et al. | 439/247 |
| 6,644,993 B2 * | 11/2003 | Victor | 439/175 |
| 6,702,604 B1 * | 3/2004 | Moscovitch | 439/374 |
| 6,716,058 B2 * | 4/2004 | Youn | 439/535 |
| 6,733,329 B2 * | 5/2004 | Yang | 439/518 |
| 6,746,279 B1 * | 6/2004 | Lopez | 439/620.01 |
| 6,754,343 B2 * | 6/2004 | Lundstrom et al. | 379/446 |
| 6,762,585 B2 * | 7/2004 | Liao | 320/107 |
| 6,767,253 B1 * | 7/2004 | Werner et al. | 439/638 |
| 6,908,324 B1 * | 6/2005 | Morley et al. | 439/218 |
| 6,934,788 B2 * | 8/2005 | Laity et al. | 710/303 |
| 6,935,883 B2 * | 8/2005 | Oddsen, Jr. | 439/374 |
| 6,943,527 B2 * | 9/2005 | Liu et al. | 320/107 |
| 6,970,351 B2 * | 11/2005 | Perez et al. | 361/679.57 |
| 6,991,483 B1 * | 1/2006 | Milan et al. | 439/171 |
| 7,014,486 B1 * | 3/2006 | Wu et al. | 439/248 |
| 7,066,752 B2 * | 6/2006 | Hsu et al. | 439/248 |
| 7,074,065 B1 * | 7/2006 | Martinez et al. | 439/247 |
| 7,090,521 B2 * | 8/2006 | Nishio et al. | 439/248 |
| 7,153,169 B2 * | 12/2006 | Lord | 439/680 |
| 7,167,207 B2 * | 1/2007 | Kawaguchi et al. | 348/375 |
| 7,175,450 B1 * | 2/2007 | Lung | 439/155 |
| 7,201,611 B2 * | 4/2007 | Faranda | 439/638 |
| 7,238,042 B2 * | 7/2007 | Chen et al. | 439/374 |
| 7,253,840 B2 * | 8/2007 | Kayanuma | 348/375 |
| 7,269,002 B1 * | 9/2007 | Turner et al. | 361/679.55 |
| 7,311,541 B2 * | 12/2007 | Chien et al. | 439/246 |
| 7,390,211 B2 * | 6/2008 | Moscovitch | 439/374 |
| 7,393,224 B2 * | 7/2008 | Milan | 439/171 |
| 7,419,393 B2 * | 9/2008 | Milan | 439/171 |
| D583,820 S * | 12/2008 | O'Shea | D14/434 |
| 7,479,024 B2 * | 1/2009 | Chen et al. | 439/310 |
| 7,485,003 B2 * | 2/2009 | Mandrusov et al. | 439/607.41 |
| 7,503,808 B1 * | 3/2009 | O'Shea | 439/639 |
| 7,508,658 B2 * | 3/2009 | Ling | 361/679.55 |
| 7,594,823 B2 * | 9/2009 | Moscovitch | 439/374 |
| 7,690,944 B2 * | 4/2010 | Matsumura et al. | 439/578 |
| 7,736,179 B2 * | 6/2010 | Cook et al. | 439/577 |
| 7,806,727 B2 * | 10/2010 | Dold et al. | 439/587 |
| 7,919,712 B2 * | 4/2011 | Mori | 174/50 |
| 7,978,466 B2 * | 7/2011 | Lewandowski et al. | 361/679.41 |
| 8,011,952 B1 * | 9/2011 | Zhong et al. | 439/540.1 |
| 8,083,195 B2 * | 12/2011 | Osada | 248/274.1 |
| 8,092,261 B2 * | 1/2012 | Lord | 439/680 |
| 8,105,108 B2 * | 1/2012 | Vroom et al. | 439/540.1 |
| 8,113,873 B1 * | 2/2012 | Sarraf | 439/533 |
| 8,179,672 B2 * | 5/2012 | Carnevali | 361/679.41 |
| 8,276,399 B2 * | 10/2012 | Maglinger | 62/377 |
| RE43,869 E * | 12/2012 | Lewandowski et al. | 361/679.4 |
| 8,366,465 B2 * | 2/2013 | Cheng | 439/172 |
| 8,366,468 B2 * | 2/2013 | Carnevali | 439/248 |
| 8,366,469 B2 * | 2/2013 | Carnevali | 439/248 |
| RE44,072 E * | 3/2013 | Milan | 439/171 |
| 8,419,479 B2 * | 4/2013 | Vroom et al. | 439/639 |
| 8,422,206 B2 * | 4/2013 | Fu et al. | 361/679.01 |
| 2002/0018559 A1 * | 2/2002 | Lundstrom et al. | 379/455 |
| 2002/0048982 A1 * | 4/2002 | Gu et al. | 439/247 |
| 2002/0176571 A1 * | 11/2002 | Louh | 379/455 |
| 2003/0062873 A1 * | 4/2003 | Hsin | 320/107 |
| 2003/0072133 A1 * | 4/2003 | Chuang | 361/686 |
| 2003/0128505 A1 * | 7/2003 | Yin et al. | 361/686 |
| 2004/0097127 A1 * | 5/2004 | Smith et al. | 439/533 |
| 2005/0286219 A1 * | 12/2005 | Kim | 361/686 |
| 2006/0105603 A1 * | 5/2006 | Nishio et al. | 439/247 |
| 2006/0250764 A1 * | 11/2006 | Howarth et al. | 361/683 |
| 2007/0002533 A1 * | 1/2007 | Kogan et al. | 361/686 |
| 2007/0230099 A1 * | 10/2007 | Turner et al. | 361/683 |
| 2008/0142651 A1 * | 6/2008 | Tomasini et al. | 248/176.1 |
| 2009/0064705 A1 * | 3/2009 | Maglinger | 62/377 |
| 2009/0117946 A1 * | 5/2009 | Tomasini et al. | 455/569.2 |
| 2010/0073862 A1 * | 3/2010 | Carnevali | 361/679.43 |
| 2010/0118485 A1 * | 5/2010 | Crooijmans et al. | 361/679.43 |
| 2010/0134072 A1 * | 6/2010 | Neu et al. | 320/137 |
| 2010/0171465 A1 * | 7/2010 | Seal et al. | 320/114 |
| 2010/0265652 A1 * | 10/2010 | Agata et al. | 361/679.41 |
| 2011/0075351 A1 * | 3/2011 | Tarnoff | 361/679.43 |
| 2011/0134601 A1 * | 6/2011 | Sa | 361/679.43 |
| 2011/0242754 A1 * | 10/2011 | Morton | 361/679.41 |
| 2011/0279966 A1 * | 11/2011 | Sayavong | 361/679.43 |
| 2012/0033375 A1 * | 2/2012 | Madonna et al. | 361/679.43 |
| 2012/0045931 A1 * | 2/2012 | Carnevali | 439/544 |
| 2012/0045932 A1 * | 2/2012 | Carnevali | 439/552 |
| 2012/0094527 A1 * | 4/2012 | Vroom et al. | 439/540.1 |
| 2012/0094528 A1 * | 4/2012 | Vroom et al. | 439/540.1 |
| 2012/0162902 A1 * | 6/2012 | Zhou et al. | 361/679.41 |
| 2012/0182675 A1 * | 7/2012 | Zhou | 361/679.01 |
| 2012/0189156 A1 * | 7/2012 | Leung | 381/387 |
| 2012/0206875 A1 * | 8/2012 | Carnevali | 361/679.41 |
| 2012/0220162 A1 * | 8/2012 | Zhou et al. | 439/501 |
| 2012/0229967 A1 * | 9/2012 | Zhou | 361/679.01 |
| 2012/0275092 A1 * | 11/2012 | Zhou | 361/679.01 |
| 2012/0293949 A1 * | 11/2012 | Zhou | 361/679.41 |
| 2013/0003291 A1 * | 1/2013 | Zhou | 361/679.41 |
| 2013/0050934 A1 * | 2/2013 | Zhou | 361/679.43 |
| 2013/0058036 A1 * | 3/2013 | Holzer et al. | 361/679.44 |

* cited by examiner

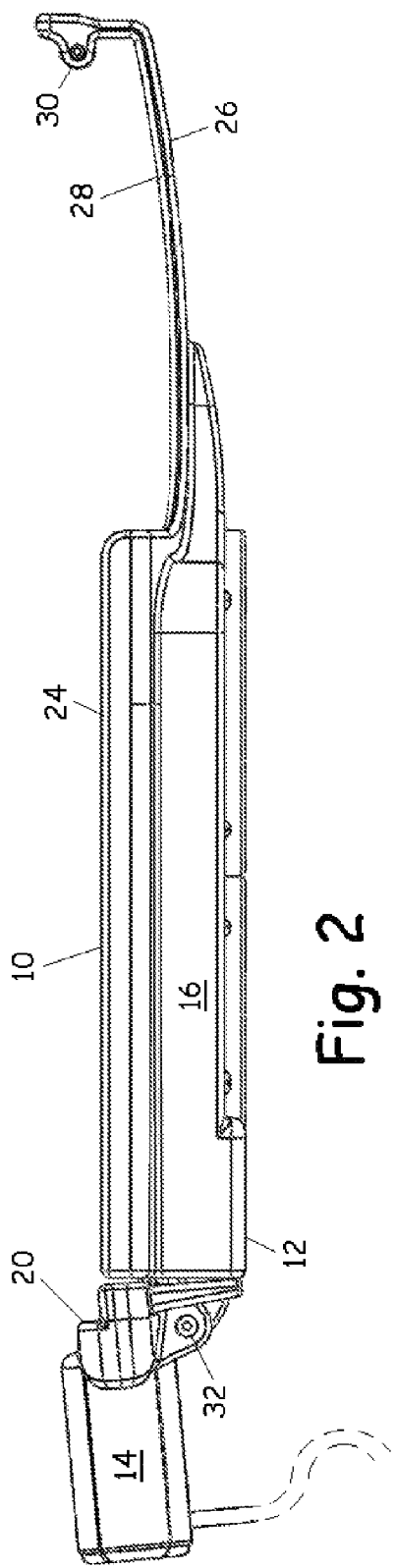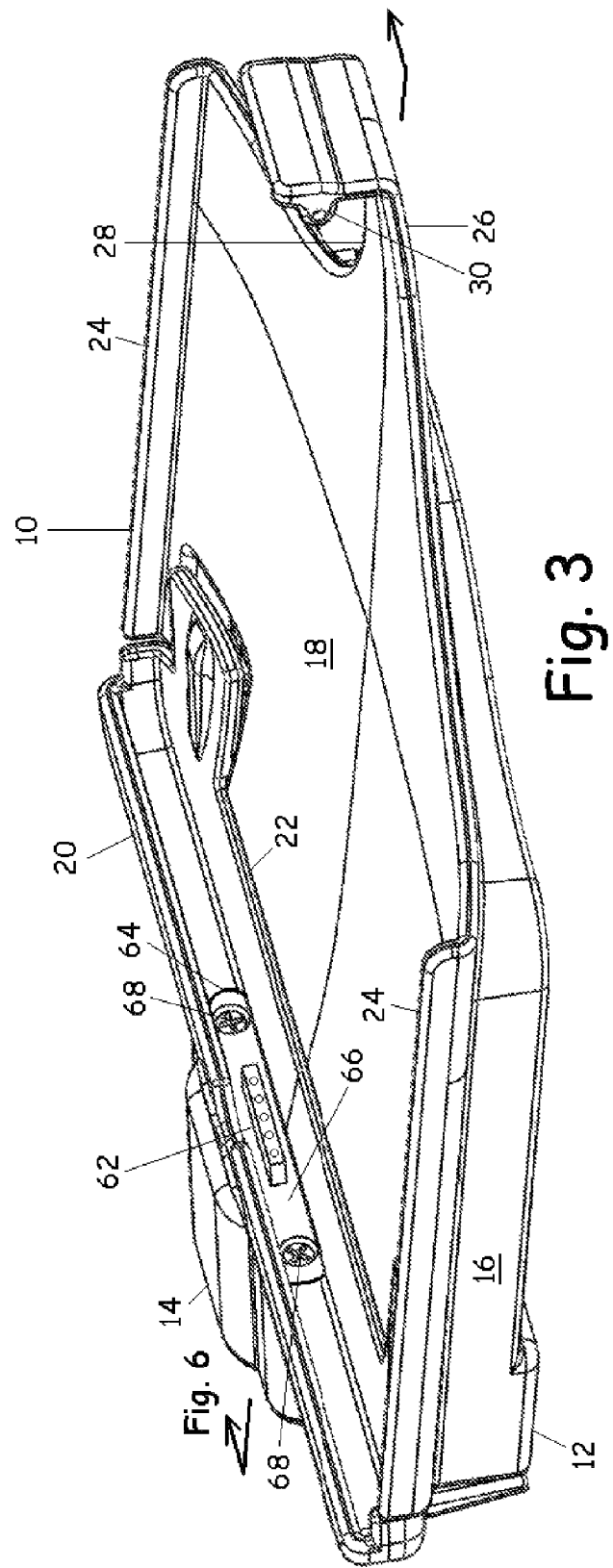

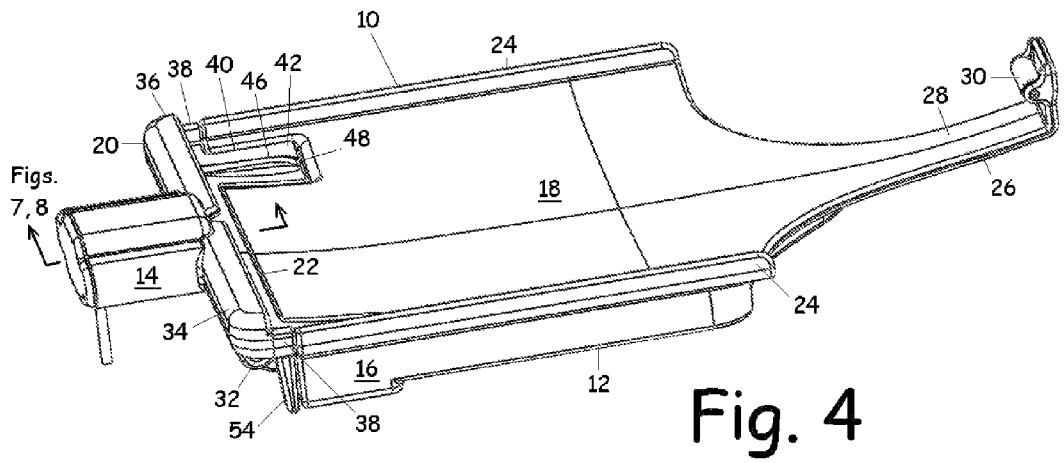
Fig. 4
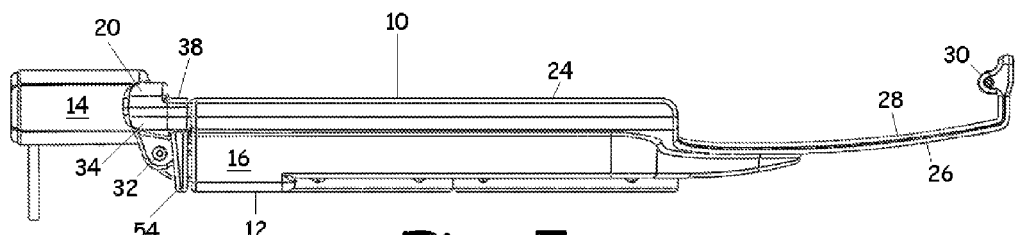
Fig. 5
Fig. 6
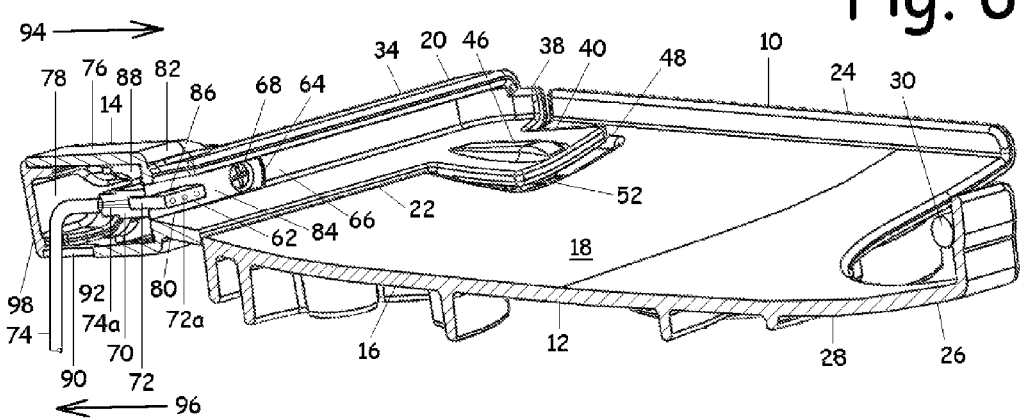

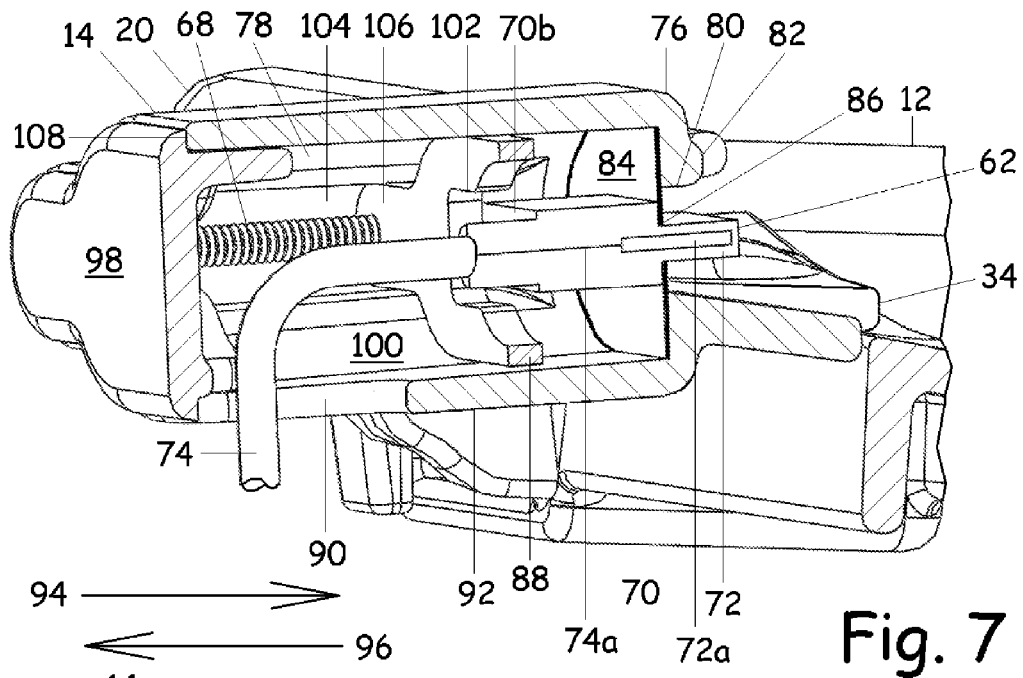
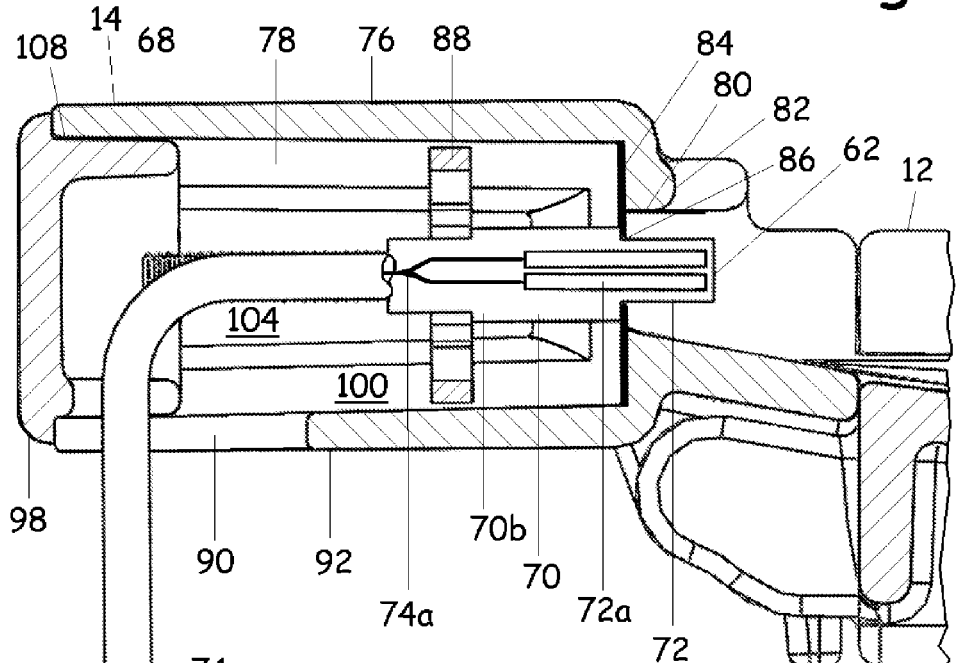

UNIVERSAL ADAPTOR MOUNT FOR A DOCKING STATION

CONTINUATION-IN-PART

This application is a Continuation-in-part and claims priority benefit of copending parent U.S. patent application Ser. No. 13/403,751 filed in the name of Jeffrey D. Carnevali on Feb. 23, 2012, the complete disclosure of which is incorporated herein by reference.

FIELD OF THE INVENTION

The present invention relates generally to cradles for holding portable electronics devices, and in particular to docking stations for portable computers and other portable electronics devices having one or more input/output (I/O) communication ports.

BACKGROUND OF THE INVENTION

Docking stations are generally well-known for supporting different portable tablets, computers, cellular telephones, portable music players or other portable electronic devices. Such docking stations are equipped with an input/output (I/O) docking connector for interfacing the electronic device to auxiliary power and/or peripheral hardware. To date, such docking stations are generally dedicated to supporting specific docking connectors for interfacing different functions, such as auxiliary power, keyboard input/output, audio/video output, printer output, or synchronization coupling, and/or a combination of one or more of these functions.

Many other functions and hardware interfaces, including GPS receivers, wireless transceivers, music making hardware such as keyboards and amplifiers, infrared dongles, car stereo adapters, as well as many others are also available for the different portable electronic devices. In general, each of these functions, hardware and/or power options interface with the portable electronic device by means of a different docking connector, plug or socket compatible with the electronic device's docking port. Accordingly, in order to connect different functions and hardware, the user must connect a variety of different docking connectors, modules, plugs, cables and and/or sockets to the electronic device.

However, although the docking connectors, modules, plugs, cables, and sockets for connecting these different functions, hardware and/or power options are each compatible with the particular electronic device, they are provided in a wide variety of different styles, sizes, and form factors.

This wide variety of connector, module, plug, cable and socket styles and shapes in use limits the ability of known docking station apparatus to secure the connection of these different styles and shapes of docking connectors, modules, plugs, cables and sockets to the docking port of the portable device. Rather, known docking station apparatus often permit the docking connectors, modules, plugs, cables and sockets to loosen and disconnect from the docking port, which interrupts service to the portable electronic device. This inability to reliably secure the connection is especially problematic when the docking station is mounted in a high vibration environment, such as an automobile or other vehicle, or where the docking station may be bumped or jostled.

SUMMARY OF THE INVENTION

The present invention is a docking station structured to support a portable computer, cellular telephone, portable music player or other portable electronic device, the docking station having a universal adapter module for holding individual ones of a plurality of different interfaces in contact with the portable electronic device in the docking station.

According to one aspect of the invention, the docking station is a docking tray that is adapted for seating a portable electronic device therein with a docking port of the portable electronic device seated against an interface portion thereof, the interface portion of the docking tray being formed with an interface outlet aperture positioned for alignment with the docking port of the portable electronic device. A connector retainer is coupleable for releasably urging individual ones of a plurality of different interfaces toward the interface portion of the docking tray and positioning a connection portion thereof adjacent to the interface outlet aperture and directed inwardly of the docking tray. An urging mechanism is adapted for urging the seated portable electronic device toward the interface portion of the docking tray and the interface outlet aperture thereof. It will be understood that at least one of the plurality of different interfaces further supports a different function from another one thereof.

According to another aspect of the invention, the docking station also includes an interface housing that is adapted for being coupled to the docking tray in a position adjacent to the interface outlet aperture, the interface housing is formed with an internal cavity sized to receive therewithin the first one of the different interfaces, and access means for removing one of the different interfaces from the housing and substituting therefor another one.

According to another aspect of the invention, the urging mechanism includes a compression plate positioned within the internal cavity of the housing with a body portion of one of the first and second interfaces between the compression plate and the interface outlet aperture; and a means for urging the compression plate toward the interface outlet aperture, whereby the connection portion of the interface is projected outwardly through the interface outlet aperture.

According to another aspect of the invention, the means for urging the compression plate is one or more a threaded members.

According to another aspect of the invention, the docking station also includes a connection portion outlet plate positioned adjacent to the interface portion of the docking tray, the connection portion outlet plate is formed with an interface outlet aperture sized to pass therethrough the connection portion of the different interfaces.

According to another aspect of the invention, the interface portion of the docking tray further includes the interface housing coupled thereto.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a side view of the docking station of FIG. 1 configured in an open state;

FIG. 3 is a perspective view of the docking station of FIG. 1 configured in the open state;

FIG. 4 is a perspective view of the docking station of FIG. 1 configured in a closed state;

FIG. 5 is a side view of the docking station of FIG. 1 configured in the closed state;

FIG. 6 is a cross-section view of the docking station of FIG. 1 configured in the closed state and showing details of the universal adapter module;

FIG. 7 and FIG. 8 are close-up cross-section views of the docking station of FIG. 1, wherein details of the universal adapter module are more clearly shown.

DETAILED DESCRIPTION OF PREFERRED EMBODIMENT

Figure 1:
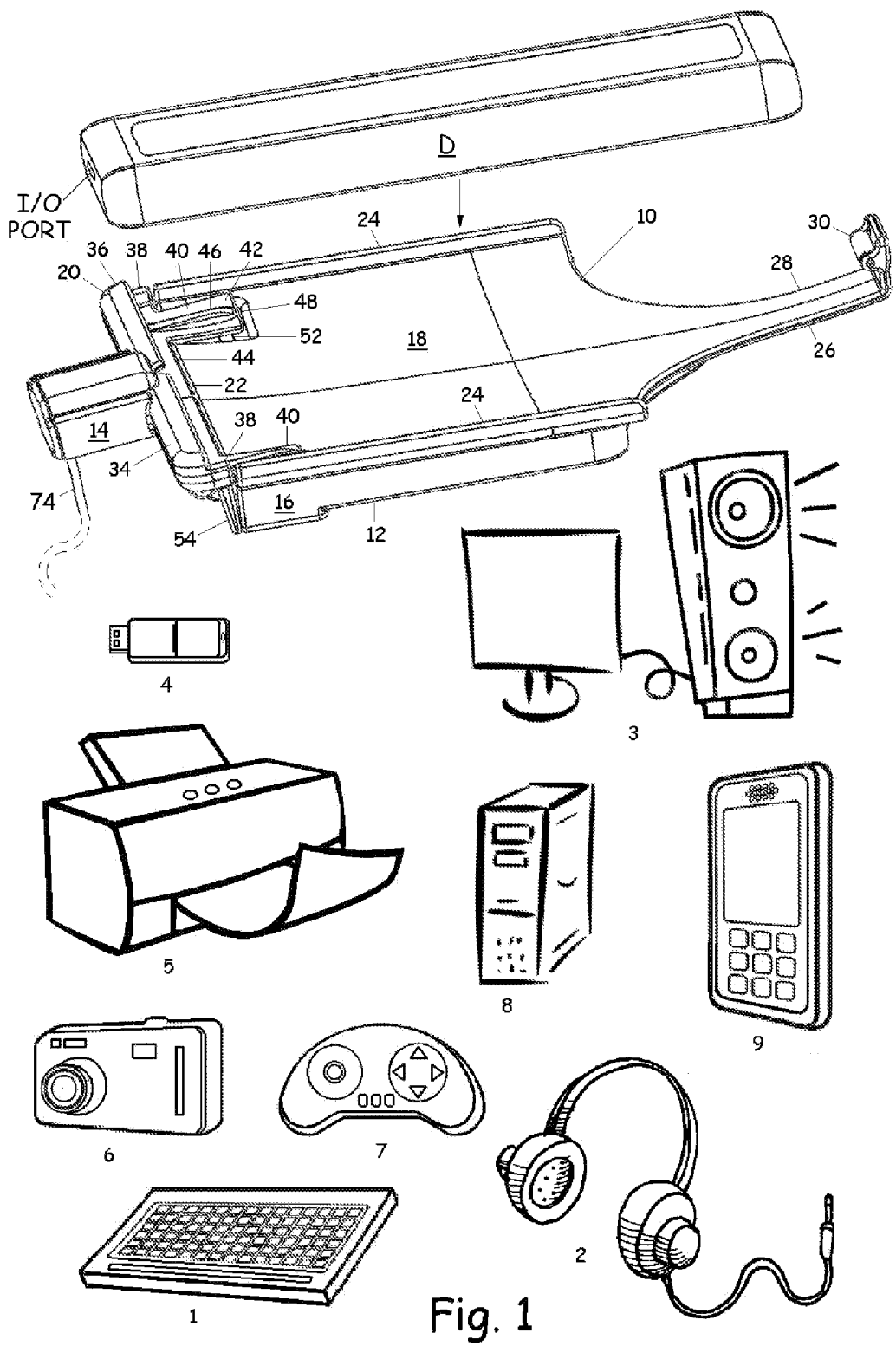
FIG. 1 is a perspective view showing an example of the docking station of the invention for supporting a portable electronics devices and having a universal adapter module mounted thereon for interfacing with the portable electronics devices.

In the Figures, like numerals indicate like elements.

FIG. 1 illustrates a docking station 10 for supporting a portable electronics devices, such as an Apple® iPad, a portable computer, cellular telephone, portable music player or another such portable electronic device intended to be operated with a docking station. Such portable electronics devices have an input/output (I/O) port for communicating signals for driving multiple functions, such as keyboard input/output 1, audio output 2, audio/video output 3, data storage input/output 4, printer output 5, image input/output 6, game control input/output 7, data input/output 8, or synchronization coupling to another device 9, just to name a few. Docking station 10 includes a docking tray 12 structured to receive thereinto the iPad or another portable electronic device, and a universal adapter module 14 for interfacing with the iPad or other portable electronic device through its I/O port. Docking tray 12 includes an tray body 16 having a bearing surface 18 on which the electronics device is to be placed, and a receiver structure 20 positioned adjacent to an edge 22 of bearing surface 18. Bearing surface 18 is positioned between opposing side walls 24 that help position the electronics device in tray 12.

Tray body 16 includes an urging mechanism 26 extended from bearing surface 18 substantially opposite from receiver structure 20. Urging mechanism 26 is adapted for cooperating with receiver structure 20 for securing the electronics device relative to tray body 16 and bearing surface 18 thereof. Urging mechanism 26, for example, is formed of slightly flexible neck 28 that is an extension of tray body 16. Urging mechanism 26 has a clip or roller 30 secured adjacent to one end of flexible neck 28 distal of bearing surface 18 for alternately securing the electronics device in docking tray 12 and releasing it therefrom.

Receiver structure 20 is structured to receive the iPad or other portable electronics device. For example, receiver structure 20 is pivotally tiltable relative to tray body 16 between an open state and a clamped state. For example, receiver structure 20 is pivotable by means of one or more pivot pins 32 coupled between receiver structure 20 and tray body 16. Here, docking tray 12 is configured in the open state with receiver structure 20 rotated outwardly from bearing surface 18 of tray body 16 for receiving thereinto the electronics device.

According to one exemplary embodiment, receiver structure 20 is formed as a J-cup having a tilting receiver 34 sized to receive a portion of the electronics device, and may have a front lead-in lip 36 for guiding the electronics device thereinto. J-cup receiver 34 pivots relative to tray body 16 into the open position (FIGS. 1, 2, 3) tilted away from bearing surface 18 of tray body 16 to aid in easy insertion and removal of the electronics device. J-cup receiver 34 also pivots back toward bearing surface 18 into closed position (FIGS. 4, 5) for seating electric device 14 against bearing surface 18 with I/O port positioned for interfacing with the universal adapter module 14. Docking tray 12 may have opposing side lips 38 for helping position the electronics device relative to universal adapter module 14.

J-cup receiver structure 20 optionally includes one or more movable preload levers 40 adjacent to bearing surface 18. For example, each preload lever 40 includes an arm 42 extended from a rear portion 44 of tilting J-cup receiver 34 of receiver structure 20 whereby preload levers 40 are pivotable relative to bearing surface 18 in combination with tilting J-cup receiver 34 by operation of pivot pins between receiver structure 20 and tray body 16. Additionally, each preload levers 40 optionally includes a compression portion 46 adjacent to an end of arm 42 distal from J-cup receiver 34 and raised above level of arm 42 inwardly toward receiver cup front portion 36. Optionally, recesses 48 sized for receiving thereinto preload levers 40 are formed in bearing surface 18 whereby the electronics device is permitted to seat against bearing surface 18 without interference from levers 40.

Optionally, an urging means 52 is coupled between preload levers 40 and tray body 16 for urging preload levers 40 outwardly of bearing surface 18. For example, urging means 52 is a spring or other resilient biasing member coupled between tray body 16 and receiver structure 20. Optionally, urging means 52 is positioned between individual preload levers 40 and tray body 16. According to one embodiment, travel of tilting J-cup receiver 34 of receiver structure 20 outwardly away from bearing surface 18 is limited. For example, a stop 54 on receiver structure 20 is positioned to encounter edge 22 of bearing surface 18 or another portion of tray body 16 for arresting outward travel of receiver structure 20.

FIG. 2 is a side view of docking station 10 that more clearly illustrates J-cup receiver 34 of receiver structure 20 configured in the open position tilted away from bearing surface 18 of tray body 16 to aid in easy insertion and removal of the electronics device.

FIG. 3 shows universal adapter module 14 that is mountable and mounted on docking station 10 for interfacing with the portable electronics device through its I/O port. Universal adapter module 14 includes an interface 62 positioned on docking tray 12. For example, interface 62 is one of a plurality of different docking connectors, modules, plugs, cables and and/or sockets, each compatible for interfacing functions and hardware, or a combination of one or more functions and/or hardware, with the seated portable electronic device D. Interface 62 is extended through an aperture 64 in an interface portion 66 of J-cup receiver 34 in a position to interface with a mating I/O port of the electronics device when it is installed in docking station 10. Here, a pair of compressors 68 position interface adapter 62 in aperture 64 and projected outwardly of interface portion 66 of J-cup receiver 34 to couple with I/O port of the electronics device seated in receiver structure 20.

FIG. 4 illustrates docking station 10 having docking tray 12 configured in the clamped state with receiver structure 20 rotated inwardly toward bearing surface 18 of tray body 16 for clamping the electronics device. While docking tray 12 is configured in the open state with receiver structure 20 tilted outwardly of bearing surface 18 of tray body 16, the electronics device is fit into J-cup receiver 34 with its I/O port mated with interface adapter 62. Receiver structure 20 is rotated inwardly toward bearing surface 18 of tray body 16, whereby the electronics device encounters clip or roller 30 at end of neck 28.

Here, neck 28 of tray body 16 is sufficiently flexible to permit the electronics device to pass between receiver structure 20 and clip or roller 30 to become seated against bearing surface 18 of tray body 16. Furthermore, neck 28 is sufficiently resilient to reform over the electronics device, and subsequently to compress the electronics device against interface portion 66 of J-cup receiver 34 and into mating contact with interface adapter 62.

When present, preload levers 40 of J-cup receiver structure 20 press outwardly of bearing surface 18 of tray body 16 for urging the electronics device against clip or roller 30 of neck 28. The electronics device is thereby restrained from moving within J-cup receiver 34 when docking station 10 is jostled or bumped. Such restraint of the electronics device causes its I/O port to remain firmly mated with interface adapter 62 in interface portion 66 of J-cup receiver 34.

FIG. 5 is a side view of docking station 10 that more clearly illustrates J-cup receiver 34 of receiver structure 20 configured in the clamped state with receiver structure 20 rotated inwardly toward bearing surface 18 of tray body 16 for clamping the electronics device.

FIG. 6 is a cross-section view of docking station 10 showing details of universal adapter module 14, wherein interface adapter 62 is projected through aperture 64 in interface portion 66 of J-cup receiver 34. For example, interface adapter 62 is formed of an adapter body 70 and an connection portion 72 of a type that is adapted for interfacing with the portable electronic device through its I/O port. Interface adapter 62 has an adapter signal interface 74, e.g., a cord or cable, that is operatively coupled to adapter plug 72 and extended from adapter body 70. For example, one or more electrical conductors 74a of cable 74 are electrically coupled to corresponding connector pins 72a of adapter plug 72. Interface adapter 62 is any one of a plurality of possible interface adapters of a type that is configured to interface with a particular portable electronics device, such as an Apple® iPad, a portable computer, cellular telephone, portable music player or another such portable electronics device. Each of the plurality of possible interface adapters 62 is generally dedicated to interfacing a single function, such as keyboard input/output, audio/video output, printer output, or synchronization coupling, or another function, as well as a variety of different docking connectors, plugs and and/or sockets compatible with the electronic device for providing many other functions and hardware interfaces, including GPS receivers, wireless transceivers, music making hardware such as keyboards and amplifiers, infrared dongles, car stereo adapters, as well as many others that are available for the different portable electronic devices. Alternatively, at least one of interface adapters 62 is a universal serial bus (USB) connector according to industry standards for connection, communication and power supply functions.

Adapter module 14 includes a housing 76 molded with an internal cavity 78 and one adapter opening 80 formed in a surface 82 thereof and communicating with internal cavity 78. A connection outlet plate portion 84 is positioned adjacent to adapter opening 80, for example but not limited to being positioned within internal cavity 78 of housing 76. Alternatively, outlet plate 84 is positioned externally of housing surface 82. Outlet plate 84 may alternatively be embedded in housing surface 82 within adapter opening 80. Outlet plate 84 includes an interface outlet aperture 86 and sized to pass adapter plug 72 slidingly therethrough without passing adapter body 70. Outlet plate 84 is sufficiently thin at least adjacent to interface outlet aperture 86 to permit a maximum length of adapter plug 72 to project therethrough for reliably interfacing with the electronics device to be placed in tray body 16. Accordingly, outlet plate 84 is preferably formed of a thin section of a substantially rigid metallic material, such as but not limited to steel.

Internal cavity 78 of housing 76 is sized to receive body 70 of interface adapter 62 therewithin with adapter plug 72 projected out of cavity 78 through interface outlet aperture 86 in outlet plate 84. Internal cavity 78 is further sized to receive a movable compression retainer 88 formed, for example as a plate. Retainer 88 is positioned within housing internal cavity 78, with adapter body 70 positioned between retainer 88 and housing adapter opening 80. Retainer 88 is thus coupleable for releasably urging individual ones of a plurality of different interfaces 62 toward interface portion 66 of docking tray 12 and positioning connection portion 72 thereof adjacent to interface outlet aperture 86 and directed inwardly of the docking tray 12. Adapter cord or cable 74 of interface adapter 62 exits housing 76 through a cable aperture 90 formed through a wall 92 of housing 76.

Pair of compressors 68 operate as means for urging movable compression plate 88 toward adapter opening 80. Pair of compressors 68 is provided for compressing adapter body 70 between compression plate 88 and plug outlet plate 84, whereby adapter plug 72 is forcibly projected outwardly of housing cavity 78 through interface outlet aperture 86 in outlet plate 84. For example, compressors 68 are threaded members or screws each operably coupled between outlet plate 84 and compression plate 88. Threaded compressors 68 are operable in a compression mode for urging compression plate 88 toward (arrow 94) plug outlet plate 84 and compressing adapter body 70 therebetween, threaded compressors 68 thereby forcibly project adapter plug 72 outwardly of housing cavity 78 through interface outlet aperture 86 in outlet plate 84. Threaded compressors 68 are also operable in an expansion mode for moving compression plate 88 away from (arrow 96) adapter opening 80. Thus operated in expansion mode, threaded compressors 68 permit or urge compression plate 88 away from housing adapter opening 80, whereby adapter plug 72 of interface adapter 62 is withdrawn from interface outlet aperture 86 and adapter body 70 is disengaged from outlet plate 84. An access plate 98 permits access to housing internal cavity 78 for removal of interface adapter 62 of a type dedicated to interfacing one function, fox audio/video output, and substitution therefor of a different one of the plurality of dedicated interface adapters, such as interface adapter 62 of a type dedicated to interfacing device synchronization or another function.

In operation, adapter housing 76 is positioned adjacent to J-cup receiver 34 of receiver structure 20, with plug outlet plate 84 adjacent to in interface portion 66 of J-cup receiver 34, and opening 80 substantially aligned with aperture 64. Plug 72 of interface adapter 62 is projected through interface outlet aperture 86 in outlet plate 84 by urging of threaded compressors 68. Thereafter, the electronics device is received into J-cup receiver 34, whereupon its I/O port is coupled with interface adapter 62. J-cup receiver 34 of receiver structure 20 tilted back toward bearing surface 18 of tray body 16 into the clamped state. The electronics device is seated in docking tray 12 by pressing the electronics device toward bearing surface 18 of tray body 16 against resistance of resiliently pivotable preload levers 40, until the electronics device encounters clip or roller 30 at end of neck 28. The electronics device is pushed inwardly past clip or roller 30 and until the electronics device deforms neck 28 sufficiently to permit passage there past. When the electronics device is seated against bearing surface 18, flexible neck 28 of tray body 16 resiliently reforms around the electronics device with the clip or roller 30 pressing it into firm contact with interface portion 66 of J-cup receiver 34 and interface adapter plug 72 through residual tension in deformed tray neck 28.

FIG. 7 and FIG. 8 are close-up cross-section views of docking station 10, wherein details of universal adapter module 14 are more clearly shown. Compression plate 88 is shown here as a movable plate that is slidable along a channel 100 formed in internal cavity 78. Compression plate 88 has an aperture 102 sized to pass adapter cord or cable 74 of interface adapter 62 while obstructing passage of adapter body 70, for example by interfering with a shoulder portion 70b thereof. Threaded compressors 68 of the means for urging movable compression plate 88 is, for example, in threaded engagement with compression plate 88. Channel 100 is configured with means for aligning adapter body 70 within internal cavity 78 and adapter plug 72 with interface outlet aperture 86 in outlet plate 84. For example, channel 100 is formed with a keyway 104 and compression plate 88 is formed with a mating key 106 moveable therealong. Accordingly, turning of threaded compressors 68 moves compression plate 88 along internal cavity 78, while key 106 in mating keyway 104 forces motion of compression plate 88 substantially linearly along internal cavity 78 toward (arrow 94) or away from (arrow 96) adapter opening 80 of housing 76, and positions adapter plug 72 in interface outlet aperture 86 in plug outlet plate 84 positioned therein.

Access plate 98 is more clearly shown as a plug engaged in another opening 108 through housing 76 and providing access into internal cavity 78 for changing between different ones of the plurality of interface adapters 62 dedicated to supporting different functions.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A docking station, comprising:
   a docking tray adapted for seating a portable electronic device therein with a docking port of the portable electronic device seated against an interface portion thereof, the interface portion of the docking tray comprising an interface outlet aperture positioned for alignment with the docking port of the portable electronic device; and
   a connector retainer coupleable for releasably positioning individual ones of a plurality of different interfaces adjacent to the interface portion of the docking tray and positioning a connection portion thereof adjacent to the interface outlet aperture and directed inwardly of the docking tray; and
   a mechanism adapted for directing the seated portable electronic device toward the interface portion of the docking tray adjacent to the interface outlet aperture thereof.

2. The docking station of claim 1, wherein at least a second one of the plurality of different interfaces further supports a different function from a first one thereof.

3. The docking station of claim 2, further comprising access means for removing the first one of the different interfaces and substituting therefor the second one thereof; and
   wherein the connector retainer further comprises: a compression member positioned adjacent to the interface portion of the docking tray with a body portion of one of the first and second interfaces between the compression member and the interface outlet aperture; and
   a means for urging the compression member toward the interface outlet aperture, whereby the connection portion of the interface is projected outwardly through the interface outlet aperture.

4. The docking station of claim 3, wherein the means for urging the compression member further comprises a threaded member.

5. The docking station of claim 3, wherein the mechanism adapted for directing the seated portable electronic device toward the interface portion of the docking tray further comprises means for urging the seated portable electronic device toward the interface portion of the docking tray and the interface outlet aperture thereof.

6. The docking station of claim 2, further comprising a connection portion outlet plate positioned adjacent to the interface portion of the docking tray, the connection portion outlet plate comprising interface outlet aperture sized to pass therethrough the connection portion of the different interfaces.

7. The docking station of claim 1, wherein the connector retainer is further coupleable for releasably urging the interfaces toward the interface portion of the docking tray and positioning the connection portion thereof adjacent to the interface outlet aperture.

8. The docking station of claim 1, wherein the mechanism adapted for directing the seated portable electronic device toward the interface portion of the docking tray adjacent to the interface outlet aperture thereof further comprises an urging mechanism adapted for urging the seated portable electronic device toward the interface portion of the docking tray and the interface outlet aperture thereof.

9. A docking station, comprising:
   a docking tray comprising a bearing surface adapted for seating a portable electronic device thereon with a docking port of the portable electronic device seated against an interface portion thereof, the interface portion of the docking tray comprising an interface outlet aperture positioned for alignment with the docking port of the portable electronic device; and
   a connector retainer coupleable adjacent to the interface outlet aperture of the docking tray for releasably positioning individual ones of a plurality of different interfaces partially through the interface outlet aperture adjacent to the interface portion of the docking tray and positioning a connection portion thereof adjacent to the interface outlet aperture and directed inwardly of the docking tray toward the bearing surface thereof; and
   an urging mechanism positioned substantially opposite from the receiver structure of the docking tray and adapted for urging the seated portable electronic device toward the interface portion and the interface outlet aperture thereof.

10. The docking station of claim 9, further comprising a chamber in a position adjacent to the interface outlet aperture, the chamber sized for receiving therewithin the first one of the different interfaces, and further comprising an opening thereinto sized for removing the first one of the different interfaces therefrom and installing therein the second one thereof; and
    wherein the connector retainer coupleable further comprises: a compression plate positioned within the chamber with a body portion of one of the first and second interfaces between the compression plate and the interface outlet aperture, the compression plate comprising an aperture sized to pass an adapter signal interface of alternative ones of the plurality of different interfaces; and
    one or more compressors adapted for urging the compression plate toward the interface outlet aperture, whereby at least the connection portion of the interface is projected outwardly through the interface outlet aperture.

11. The docking station of claim 10, wherein at least one of the compressors further comprises a threaded member.

12. The docking station of claim 10, wherein the chamber further comprises a channel communicating with the opening thereinto; and further comprising a guide cooperating between the compression plate and the channel.

13. The universal adapter module of claim 12, wherein the guide further comprises a keyway and a cooperating key between the compression plate and the channel.

14. The docking station of claim 9, wherein a second one of the plurality of different interfaces further supports a different function from a first one thereof.

15. The docking station of claim 14, wherein the receiver structure of the docking tray further comprises the interface housing.

16. The docking station of claim 14, wherein the receiver structure is further pivotable relative to the tray body.

17. The docking station of claim 9, wherein the connector retainer is further coupleable adjacent to the interface outlet aperture of the docking tray for releasably urging the individual ones of a plurality of different interfaces partially through the interface outlet aperture and toward the interface portion of the docking tray.

18. A docking station, comprising:

a docking tray comprising a receiver structure adjacent to a bearing surface that is adapted for seating a portable electronic device thereon with a docking port of the portable electronic device seated against an interface portion thereof, the interface portion of the docking tray comprising an interface outlet aperture positioned for alignment with the docking port of the portable electronic device; and a connector retainer coupleable adjacent to the interface outlet aperture of the docking tray for releasably compressing individual ones of a plurality of different interfaces partially through the interface outlet aperture and toward the interface portion of the docking tray and positioning a connection portion thereof adjacent to the interface outlet aperture and directed inwardly of the docking tray toward the bearing surface thereof, wherein at least two of the individual ones of the plurality of different interfaces each support a different function relative to the portable electronic device; and an urging mechanism positioned substantially opposite from the receiver structure of the docking tray and adapted for cooperating therewith for securing the portable electronic device relative to the bearing surface, and further adapted for urging the seated portable electronic device toward the interface portion and the interface outlet aperture thereof.

19. The docking station of claim 18, further comprising a molded interface housing in a position adjacent to the interface outlet aperture, the interface housing comprising an internal cavity sized for receiving therewithin a first one of the different interfaces, and further comprising an access opening through one surface thereof into the internal cavity sized for removing the first one of the different interfaces from the housing and installing therein a second one thereof; and wherein the connector retainer further comprises: a substantially rigid compression plate positioned within the internal cavity of the housing with a body portion of one of the interfaces between the compression plate and the interface outlet aperture, the compression plate comprising an aperture sized to pass an adapter signal interface of alternative ones of the plurality of different interfaces; and one or more compressors adapted for urging the compression plate toward the interface outlet aperture, whereby at least the connection portion of the interface is projected outwardly through the interface outlet aperture toward the bearing surface of the docking tray.

20. The docking station of claim 19, wherein the internal cavity of the housing further comprises a channel communicating between the access opening and the outlet plate in the adapter opening of the housing; and further comprising a guide cooperating between the compression plate and the channel for guiding the compression plate along the channel.

21. The docking station of claim 18, wherein the receiver structure is further pivotable relative to the bearing surface of the docking tray.

22. The docking station of claim 18, wherein the receiver structure further comprises the interface outlet aperture.

23. The docking station of claim 18, wherein the connector retainer is further coupleable adjacent to the interface outlet aperture of the docking tray for releasably urging the individual ones of a plurality of different interfaces partially through the interface outlet aperture and toward the interface portion of the docking tray.

* * * * *